United States Patent

Maca

[15] 3,636,662

[45] Jan. 25, 1972

[54] CIRCUIT BOARD CLEANING MACHINE

[72] Inventor: Paul Donald Maca, 4225 Rose St., Western Springs, Ill. 60558

[22] Filed: Dec. 10, 1969

[21] Appl. No.: 883,942

Related U.S. Application Data

[63] Continuation-in-part of Ser. No. 700,453, Jan. 25, 1968, abandoned.

[52] U.S. Cl. .......................................... 51/5, 15/77, 15/302, 15/308, 51/78

[51] Int. Cl. .......................................... B24b 7/06

[58] Field of Search .................... 51/5, 76 R, 78, 80 A, 87 R, 51/400; 15/77, 302, 308

[56] References Cited

UNITED STATES PATENTS

| | | | |
|---|---|---|---|
| 1,930,575 | 10/1933 | Wynd et al. | 15/308 X |
| 2,266,490 | 12/1941 | Endebrock | 15/77 X |
| 2,380,550 | 7/1945 | Reed | 15/77 X |
| 2,852,791 | 9/1958 | Febinger | 15/77 |
| 3,498,303 | 3/1970 | Eaves et al. | 15/302 X |

FOREIGN PATENTS OR APPLICATIONS

| | | | |
|---|---|---|---|
| 635,897 | 2/1962 | Canada | 51/400 |

*Primary Examiner*—Lester M. Swingle
*Attorney*—Parker, Carter & Markey

[57] ABSTRACT

A circuit board cleaning machine having a roller conveyor adapted to convey the printed circuit boards to be cleaned, first into contact with a nonwoven, mineral-impregnated nylon brush which is run wet, then through a rinsing chamber, and then through a drying area. The brush is maintained sufficiently wet to form a hydroxide coating on the printed circuit board and to prevent the brush from liquefying during cleaning operation.

4 Claims, 3 Drawing Figures

INVENTOR.
Paul D. Maca
BY Parker & Carter
Attorneys.

INVENTOR.
Paul D. Maca
BY Parker & Carter
Attorneys.

INVENTOR.
Paul D. Maca
BY Parker, Carter & Markey
Attorneys.

CIRCUIT BOARD CLEANING MACHINE

This is a continuation-in-part of my copending application Ser. No. 700,453, filed Jan. 25, 1968 and now abandoned.

SUMMARY OF THE INVENTION

This invention relates to cleaning machines and more particularly to a machine adapted to clean printed circuit boards.

One object of this invention is to provide a machine that will automatically clean oxide, discolorations, and other deleterious matter from the surface of a printed circuit board.

Another object is to provide a machine as above that forms a satin finish on the cleaned surface.

Another object is to provide a machine as above described that will readily accept printed circuit boards of varying thickness.

Another object is to provide a machine as above that will rinse all loosened residue from the cleaned surface and then dry the board.

Another object is to provide a machine as above which minimizes the stock removal during cleaning.

Another object is to form a hydroxide coating on the printed circuit boards which aids the adherence of solder or resist coats applied in subsequent operations and retards the formation of oxide.

Another object is to prevent the nonwoven mineral-impregnated nylon brush from liquefying during cleaning operations.

Other objects and advantages of the invention will become apparent on reading the following description of the invention.

BRIEF DESCRIPTION OF THE DRAWINGS

The invention is illustrated more or less diagrammatically in the accompanying drawings, wherein.

DESCRIPTION OF THE PREFERRED EMBODIMENT

Figure 1:
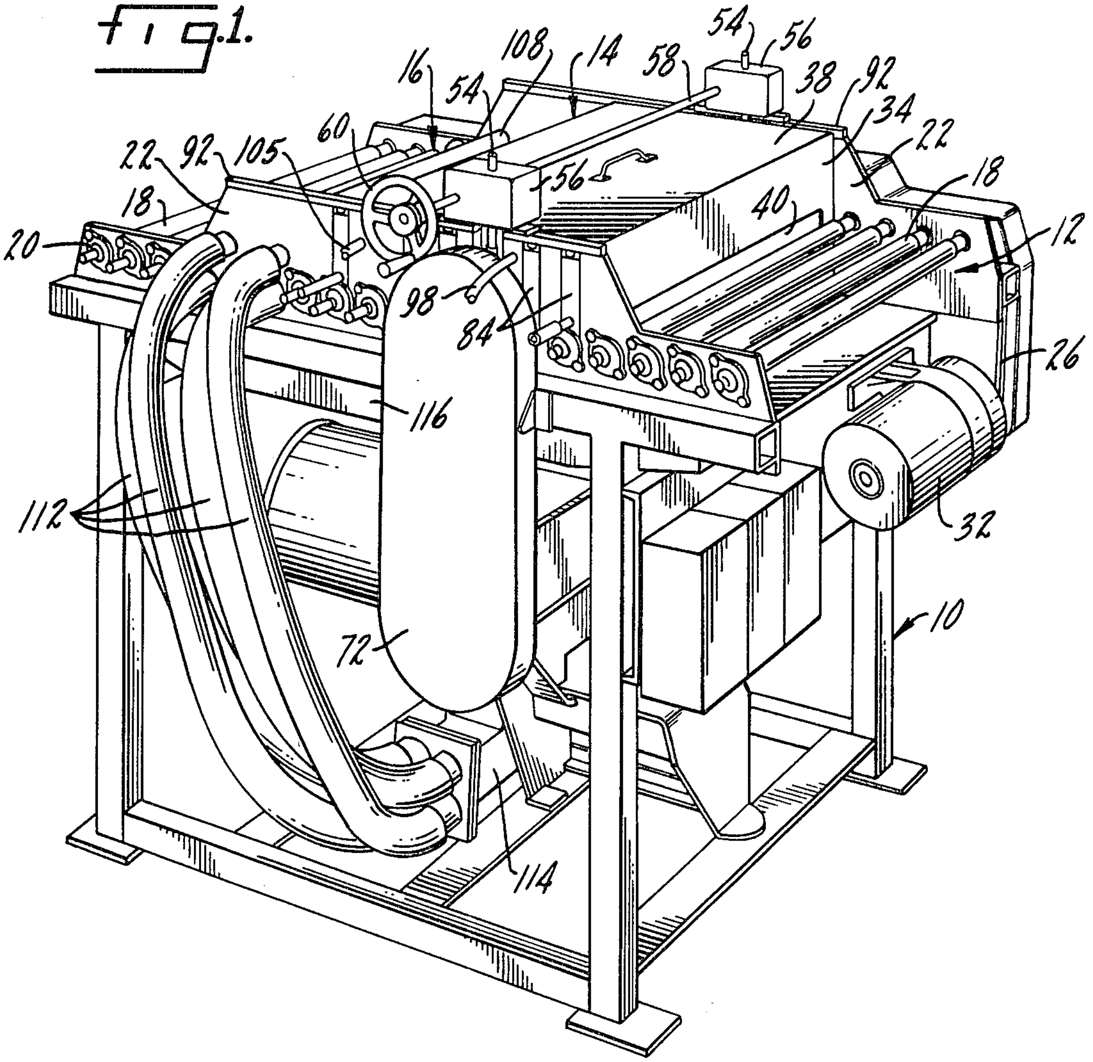
FIG. 1 is a perspective view of one embodiment of the circuit board cleaning machine of this invention.

Referring now to the drawings particularly to FIG. 1, one embodiment of the cleaning machine of this invention has been shown as comprising frame 10, conveying means 12, a cleaning and rinsing compartment 14, and drying means 16.

Figure 2:
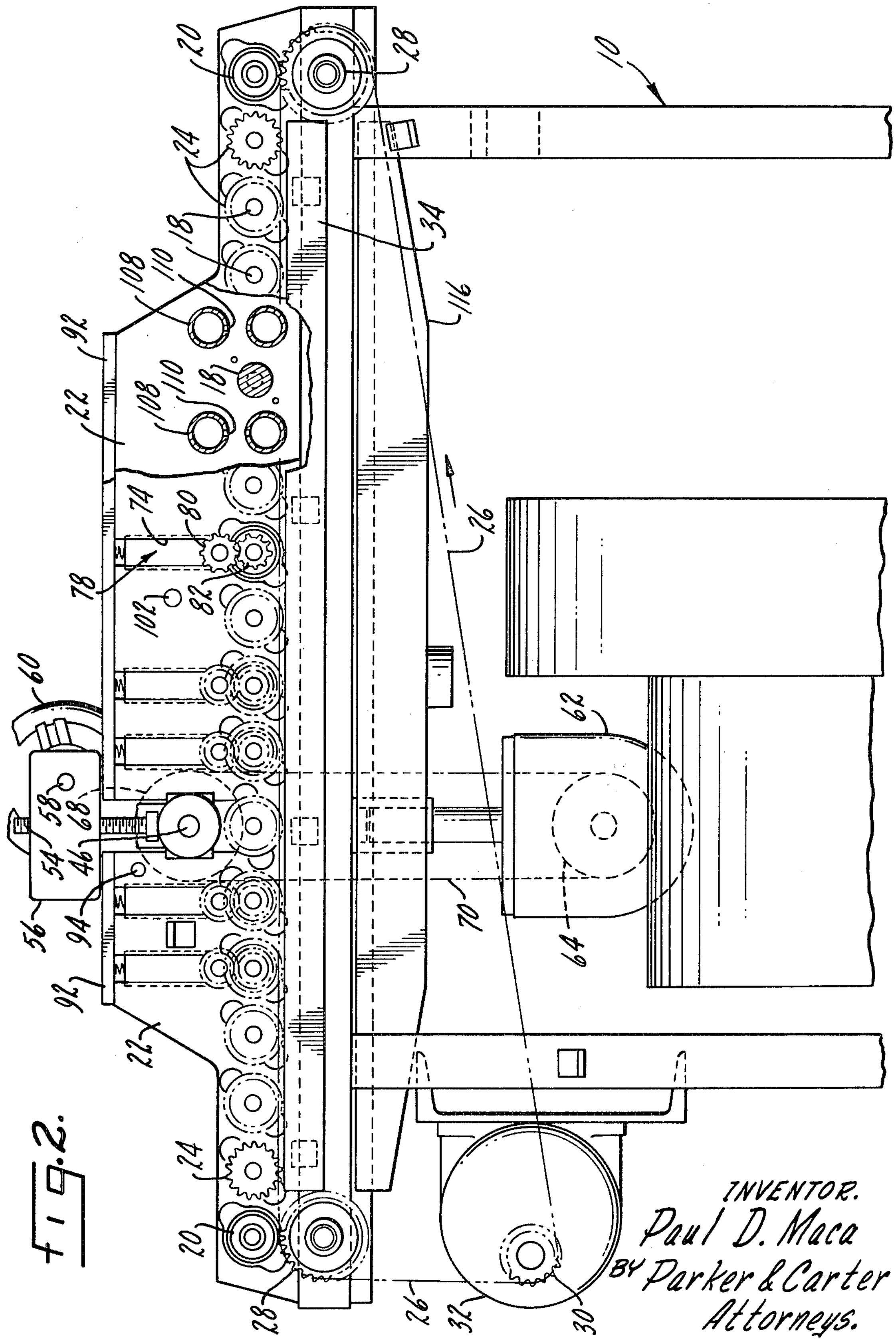
FIG. 2 is a partial side elevational view of the cleaning machine of FIG. 1.

The conveying means 12 is shown formed by a plurality of spaced, generally parallel rollers 18 rotatably supported at each end by suitable bearings 20 which are in turn secured to spaced parallel side bars 22 carried by the frame 10. As best shown in FIG. 2, each conveying roller 18 (other than the extreme end rollers) is provided with a sprocket 24. The sprockets 24 engage a suitable drive chain 26 which in turn engages idler sprockets 28 at each end of the cleaning machine and a drive sprocket 30. The drive sprocket 30, and hence the drive chain 26 and conveying rollers, are driven by a suitable motor 32. A drive chain support bar 34 may be provided to maintain the drive chain 26 in driving engagement with the conveyor roller sprockets 24.

Although a roller conveyor has been shown, it will be understood that other suitable, well-known conveying devices such as a belt conveyor and the like may be used.

Figure 3:
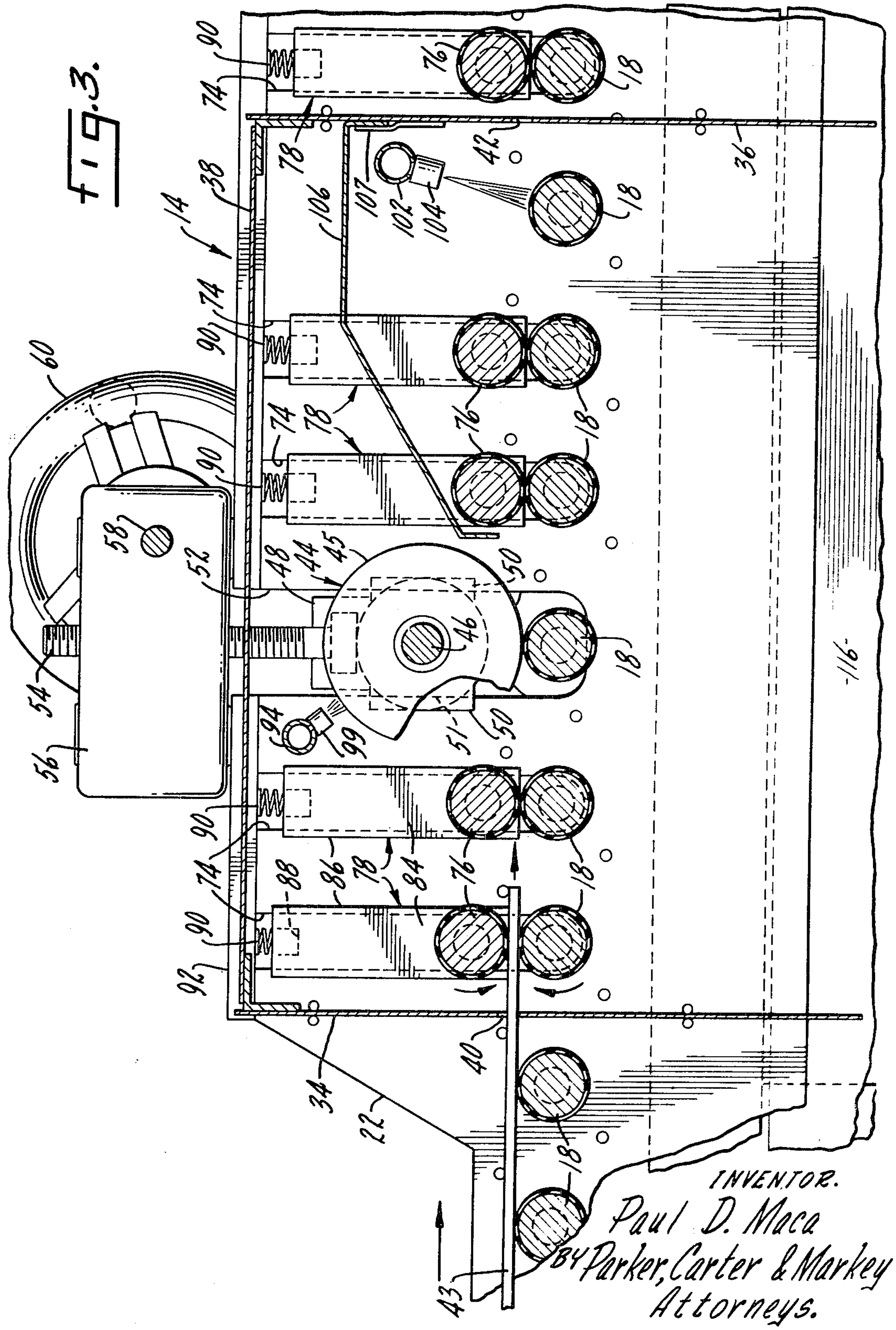
FIG. 3 is a cross-sectional view to an enlarged scale showing the cleaning and rinsing portion of the machine of FIG. 1.

The cleaning and rinsing compartment 14 is best shown in FIG. 3 and is formed or defined by side bars 22, end panels 34 and 36, and a suitable cover plate 38. The end panels 34 and 36 are respectively formed with slots 40 and 42 to allow ingress and egress of a printed circuit board 43 being carried along the conveyor course into and from the cleaning and rinsing compartment 14.

Means for engaging and cleaning the circuit board 43 have been shown at 44 as comprising a cylindrical brush 45 carried for rotation by and with a shaft 46 which is supported adjacent its end by slidable bearing blocks 48. Each bearing block 48 is formed with two spaced parallel pairs of oppositely extending flanges 50 which form channels 51 therebetween. Each side bar 22 is formed with an elongated cutout 52 adapted to slidingly receive one of said bearing blocks 48 with the vertically extending edges of the cutout 52 extending within the channels 51.

A threaded rod 54 is secured to and extends vertically from each slidable bearing block 48. As best shown in FIG. 1, each rod 54 extends into a suitable gearbox 56. The gearboxes 56 are adapted to be driven by rotatable shaft 58 extending therebetween and transform the rotational movement of shaft 58 into linear axial movement of the threaded rods 54. A handwheel 60 is secured to one extending end of the shaft 58 to facilitate manual rotation of the shaft 58 and hence, adjustment of the position of the brush 45 relative to the conveying means 12, it being understood that when the handwheel 60 is rotated in one direction, the brush 45 will be moved toward the conveyor course and when the handwheel is rotated in the other direction, the brush 45 will be moved away from the conveyor course.

The brush 45 may be rotatably driven by a drive motor 62 having a drive sheave 64, a driven sheave 68 suitably secured to an extending end of the brush shaft 46, and a suitable belt 70 in driving connection between the sheaves 64 and 68. A suitable belt guard 72 may be provided to cover the brush-driving connection.

A plurality of pinch rollers 76 are shown extending generally parallel to and positioned above some of the conveying rollers 18. Each pinch roller 76 is rotatably mounted at its ends to side bars 22 by slide bearings 78.

Each slide bearing 78 is formed with a central body portion 84 having flanges 86 extending oppositely therefrom. A plurality of elongated, vertically extending cutouts 74 are formed in each side bar 22 for receipt of the slide bearings 78. Each slide bearing 78 is slidably mounted with the flanges 86 engaging the inner surface of its side bar 22 and with the body portion 84 extending into its respective cutout 74. Each slide bearing 78 is provided with pocket 88 at the upper end for receiving a spring 90. The spring 90 extends upwardly out of the pocket 88 and engages a retaining member 92 secured to an upper edge of each side bar 22. Accordingly, each pinch roller 76 is yieldingly urged toward its respective underlying conveying roller 18.

Each pinch roller 76 is rotatably driven by a gear 80 secured to one end thereof which engages a gear 82 secured to its underlying roller 18 as shown in FIG. 2.

Although five pinch rollers 76 have been shown, with two said rollers being on the upstream side of brush 45 and three said rollers being on the downstream side of brush 45, it should be understood that the number and arrangement of the pinch rollers may be varied.

A water supply conduit 94 is secured between the side bars 22 in a position closely spaced above and generally paralleling the brush 45. The conduit 94 is connected to a source of water (not shown) by a conduit 98 and is equipped with nozzles 99 to distribute the water generally evenly along the length of the cylindrical brush 45. The water applied to the brush 45, which is constructed of a nonwoven mineral-impregnated nylon, not only cools the brush to keep the nylon from liquefying and depositing on the printed circuit boards, but also forms a hydroxide coating on the copper surface of the printed circuit boards. The hydroxide coating aids adherence of solder to the circuit boards in subsequent operations and also retards the formation of oxides on the printed circuit boards. The hydroxide coating also provides maximum adherence for the resist material which is later applied. The nonwoven nylon brush is impregnated with either silicon carbide or aluminum oxide and these brushes are sold by the 3M Company under the trademark "Scotch-Brite." Similar brushes are sold by other manufacturers.

Downstream of the brush 45, means for rinsing the cleaned circuit board have been generally shown as comprising a tube or conduit 102 having a plurality of axially spaced nozzles 104. The rinse tube 102 is secured between the side bars 22 in a position generally paralleling rollers 18. One end of the rinse tube 102 is plugged in a conventional manner and the other end is connected to a suitable source of rinsing fluid (not shown) by a conduit 105.

A suitably formed splash runoff member 106 may be provided which extends between the side bars 22 to prevent contamination of the printed circuit boards being rinsed by matter expelled by the rotating brush 45. The splash runoff member 106 may be suitably secured to the end panel 36 by clips 107.

A dryer unit may be provided to dry each circuit board 43 as it is conveyed along conveying means 12. A plurality of dryer tubes or conduits 108 are secured between side bars 22 in a position closely spaced from the conveyor course 12 and generally paralleling rollers 18.

Although four such tubes have been shown, with two positioned below the conveyor course 12 and two positioned above the conveyor course, it should be understood that the number and arrangement of the tubes 108 might be varied. Each tube 108 has been shown formed with an elongated slot 110 through which the drying air is directed to the surfaces of the board 43. One end of each air delivery tube 108 is suitably plugged and the other end is connected to a conduit 112 which is in turn connected to a suitable air blower 114.

A drain pan 116 may be provided to collect the fluid discharged from the coolant delivery tube 94 and the rinse delivery tube 102.

The rollers 18 and 76 are preferably provided with a neoprene or other like suitable covering as shown in FIG. 3.

The use, operation and function of this invention are as follows:

Printed circuit boards are commonly formed by partially coating a copper-clad board with photoresist or silk screen resist materials and then subjecting the coated board to an acid bath in which the uncoated copper areas are eaten away. Before a circuit board is coated with the resist material, it is necessary to remove oxides, old resist material, and other deleterious matter from the copper surface of the circuit board. The circuit board cleaning machine of this invention is adapted to efficiently and economically perform the above function as well as to rinse and dry the cleaned circuit boards.

Printed circuit boards, such as the board 43, are placed on the conveying means 12 and conveyed through slot 40 of end plate 34 into the cleaning compartment 14. Upon entry into the compartment 14, the leading edge of the printed circuit board 43 engages the first pinch roller 76 which moves vertically away from its underlying roller 18 to permit passage of the circuit board 43 therebetween. Each pinch roller 76 is yieldingly urged against the printed circuit board 43 by the springs 90.

The circuit board 43 proceeds along the conveying course and engages the cleaning brush 45 which may be rotating in the same or opposite direction as the conveying rollers 18. However, it will be understood that the rotational speeds of the conveying rollers 18 and the brush 45 must be such that there is relative movement between the surface of the brush 45 engaging the circuit board 43 and the circuit board 43. The frictional engagement of the brush 45 with the printed circuit board 43 removes an extremely fine amount of stock from the printed circuit board and consequently removes oxides, resist material, and other deleterious material from the printed circuit board. The water sprayed on the brush 45 through the nozzles 99 not only cools the brush but also keep the brush wet so that water is transferred to the surface of the printed circuit board. The water reacts with the copper of the board to form a hydroxide which both assists in the adherence of solder which may be applied in subsequent operations and also retards the formation of oxide which would interfere with the adherence of the resist material. It has been found that it is important to thoroughly and uniformly wet the brush 45 to obtain the aforementioned advantages and to prevent the nylon in the brush from liquefying and depositing on the circuit board. The deposits of nylon will cause poor adherence of the resist material to the board.

It should be noted that a conveying roller 18 has been provided immediately beneath the brush 45 to support the board and prevent it from being subjected to any severe loading.

Each printed circuit board 43 is conveyed past the brush 45 at a uniform speed because of the gripping action provided by the pinch rollers 76. As will be understood, the gears 80 and 82 are selected such that the tangential velocity of that portion of each roller which engages the board 43 will be generally equal.

As each printed circuit board passes beneath brush 45, the frictional and/or abrasive engagement therebetween removes an extremely small amount of stock from the circuit board and thereby removes or loosens oxides, resist material, and deleterious matter so that it may be washed off during the rinsing cycle. The brush 45 also leaves a surface having a homogeneous appearance and a satin finish as fine as 8 to 15 RMS.

The spring-loaded pinch rollers 76 will automatically adjust to accept a wide range of printed circuit board thicknesses. The position of the brush 45 may be accurately adjusted for various board thicknesses using handwheel 60 through gearboxes 56.

As the printed circuit board is conveyed downstream of the brush 45, it enters a rinsing chamber formed generally by splash runoff member 106. In this rinse chamber, water is sprayed against the cleaned surface under relatively high pressure through conduit 102 and nozzles 104. The printed circuit board is then conveyed through slot 42 formed in end panel 36 and hence between the air blower tubes 108. While passing between the air blower tubes 108, the printed circuit board is dried by air forced through the slot 110 in each tube by blower 114.

Although a preferred embodiment of the invention has been depicted and described, it should be understood that many additions, alterations, and variations may be made without departing from the invention's fundamental theme. Further, although the apparatus has been described as being particularly adapted for cleaning printed circuit boards, it should be understood that it may be used to clean a variety of like products. Accordingly, the scope of the invention should be limited only by the scope of the following appended claims.

I claim:

1. An apparatus adapted for cleaning circuit boards including:

a supporting frame, conveying means carried by said frame and defining a generally planar conveyor course, a nonwoven, mineral-impregnated nylon brush means for engaging and cleaning said circuit boards, means for adjustably mounting said brush means to said frame so that said brush means can be adjusted to engage circuit boards of various thicknesses to a selectable degree as the circuit boards are carried along said planar conveyor course, means for rotatably driving said brush means, means for gripping said circuit boards as they are conveyed past said brush means to ensure movement of said circuit boards at a generally uniform speed, and nozzle means for applying water to said brush means along the length thereof in sufficient quantity to prevent the nylon of said brush means from liquefying and depositing on the circuit boards during cleaning operations.

2. The apparatus of claim 1 further characterized in that said nylon brush means is impregnated with silicon carbide.

3. The apparatus of claim 1 further characterized in that said nylon brush means is impregnated with aluminum oxide.

4. The apparatus of claim 1 further characterized by and including means for spraying rinse fluid onto said circuit boards to remove residue, and means for drying said boards prior to discharge from said apparatus.

* * * * *